United States Patent [19]

Thew et al.

[11] 4,260,575

[45] Apr. 7, 1981

[54] METHOD FOR MOLDING EAR CUSHIONS

[75] Inventors: Donald G. Thew, New Berlin; Lane Gehrig, Milwaukee, both of Wis.

[73] Assignee: Koss Corporation, Milwaukee, Wis.

[21] Appl. No.: 91,339

[22] Filed: Nov. 5, 1979

[51] Int. Cl.³ .............................................. B29D 27/00
[52] U.S. Cl. ................................. 264/154; 179/182 R; 179/184; 264/321
[58] Field of Search ................................ 264/321, 154; 179/182 R, 184

[56] References Cited

U.S. PATENT DOCUMENTS

| | | | |
|---|---|---|---|
| 2,468,721 | 4/1949 | Volkmann | 179/182 R |
| 2,529,562 | 11/1950 | Martin | 179/182 R |
| 2,622,159 | 12/1952 | Herman | 179/182 R |
| 2,802,214 | 8/1957 | Hanks | 179/182 R X |
| 2,878,153 | 3/1959 | Hacklander | 264/321 X |
| 2,977,426 | 3/1961 | Noyes et al. | 179/182 R |
| 3,084,229 | 4/1963 | Selsted et al. | 179/182 R X |
| 3,236,328 | 2/1966 | Burroughs | 179/184 X |
| 3,378,432 | 4/1968 | Spencer | 264/321 X |
| 3,406,235 | 10/1968 | Trogdon et al. | 264/321 |
| 3,586,794 | 11/1967 | Michaells | 179/182 R |
| 3,593,341 | 7/1971 | Aileo | 179/182 R X |

Primary Examiner—Philip Anderson
Attorney, Agent, or Firm—Quarles & Brady

[57] ABSTRACT

Ear cushions for headphones are formed from an open cell polyurethane foam material. An ear cushion blank is cut from the material and compressed to a desired shape between a holder and a forming tool. Heated air is forced through the porous material to set it to a contoured shape. The molding process can be performed quickly without damaging the cellular structure.

7 Claims, 4 Drawing Figures

U.S. Patent  Apr. 7. 1981  4,260,575

METHOD FOR MOLDING EAR CUSHIONS

BACKGROUND OF THE INVENTION

The field of the invention is ear cushions for headphones, and particularly, methods of making contoured ear cushions from cellular materials.

Cellular materials have been used on headphones for many years. As disclosed in U.S. Pat. Nos. 3,593,341; 3,084,229; 2,622,159 and 3,586,794, such cushions are made from various types of cellular foam plastic materials. These materials vary in their cell density (i.e. pores per inch) and in their porosity. In high quality headphones intended for the high fidelity market, these variables are carefully chosen for their specific effects on the acoustical characteristics of the headphone. For example, a less porous material provides a greater sealing effect between the headphone and the ear which enhances the bass response of the headphone. On the other hand, more porous materials do not enhance the bass response, but they do provide a more open sensation which is desired by some users. It is the objective of the headphone manufacturer to select an ear cushion material which provides the desired acoustical properties and then to mass produce the ear cushion. The ear cushion must be economically produced in large numbers and its acoustical properties must be well controlled.

Ear cushions can be shaped in a variety of ways to enhance the seal with the ear and to improve user comfort. Although many shapes, or contours, are known in the art, only a relatively few contours are actually used in commercial headphone products. This is particularly true of ear cushions formed from porous plastic foam materials which are typically die cut into circular discs or circular rings. Attempts have been made to mold foam cushions by heating the material, but such methods take too much time or form a skin on the material which is acoustically undesirable. For example, a typical porous foam material may require as much as one hour in an oven before it can be molded into a cushion. Clearly, this is impractical for mass production and attempts to speed up the process by raising the temperature have destroyed the cellular structure or put a skin on the surface of the ear cushion. Neither result is desirable from an acoustical standpoint.

SUMMARY OF THE INVENTION

The present invention relates to a method of molding porous foam materials in which the material is placed between forming tools which compress it into the desired shape and a heated gas is forced through the porous material for a selected time interval. The heated gas flows quickly throughout the material and its temperature can be selected for optimum results without unduly lengthening the molding time.

A general object of the invention is to economically manufacture contoured ear cushions using porous foam material. The porous foam material is first cut into a disc and placed between a holder and a forming tool. The forming tool is lowered to compress the material into a preselected shape and hot air is forced through a central opening, or openings, in the holder. The heated air flows radially outward through the compressed foam material and escapes through an annular opening around the periphery of the forming tool.

Another object of the invention is to provide an ear cushion molded from a porous foam material which has consistent acoustical properties when mass produced. The temperature of the hot air is selected to "set" or thermally form the material in the desired shape without melting the cell walls and causing them to collapse. Although a generally homogeneous cell structure results, the density of the material is greater and the acoustic porosity of the material is less at points where the material is compressed by the forming tool. The acoustical properties are, therefore, predictable and they can be controlled to provide the desired results.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

The ear cushion according to the present invention may be formed from a number of commercially available materials. However, plastic foam materials such as open cell polyurethane foam or reticulated polyurethane foam are preferred. For acoustical reasons, a reticulated, uncompressed, polyester polyurethane foam having a density of four pounds per cubic foot and 100 pores per linear inch is preferred. For molding purposes the primary consideration is the porosity of the material since the invented method relies on heated air flowing through the material. A totally "closed cell" foam material may not therefore be used. However, foams with as few as thirty percent open cells have been successfully molded using the present invention.

Figure 1:
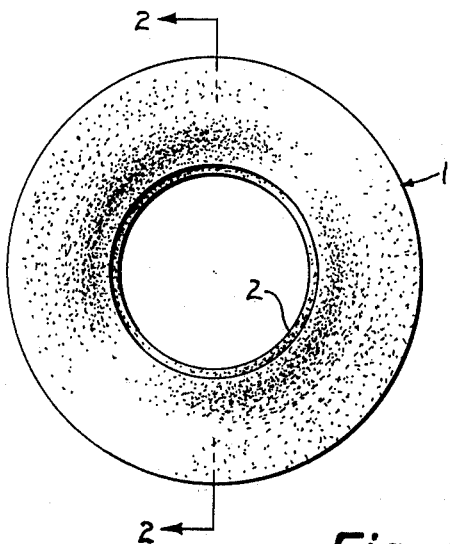
FIG. 1 is a top view of an ear cushion made according to the method of the present invention.
Figure 2:
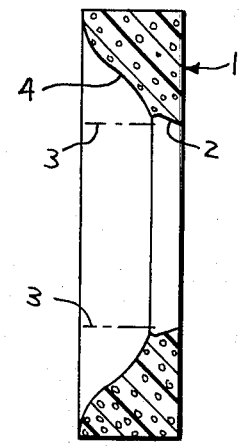
FIG. 2 is a view in cross section of the ear cushion of FIG. 1 showing its contour before and after molding.

Referring to FIGS. 1 and 2, a circular ear cushion 1 is cut from a piece of the selected foam material and it has a circular central opening 2 formed by cutting away a portion at its center. The annular body of the unmolded ear cushion has a rectangular shaped cross section as indicated by the dashed lines in FIG. 2.

Figure 3:
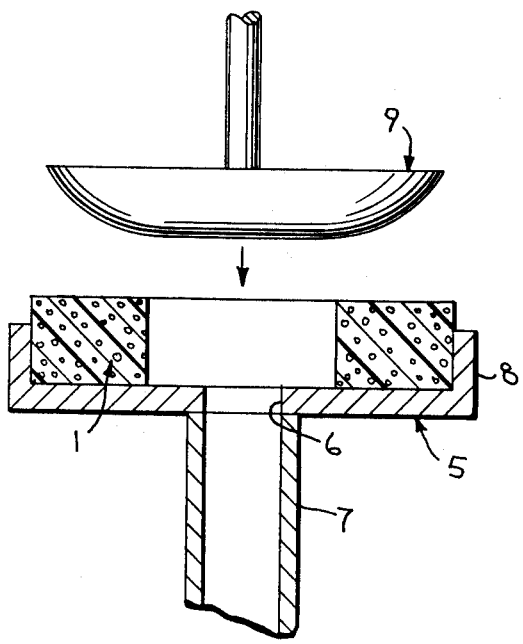
FIG. 3 is a partial elevation view with parts cut away of the molding machine with the forming tool in the raised position showing the ear cushion blank before molding.
Figure 4:
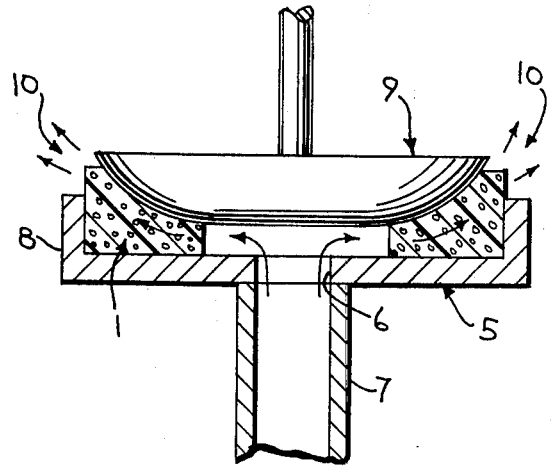
FIG. 4 is a partial elevation view with parts cut away of the molding machine with the forming tool in the lowered position.

Referring to FIGS. 3 and 4, the unmolded ear cushion "blank" is placed on a holder 5 which has a circular rim 8 that forms a recess into which the blank is received and aligned. A forming tool 9 is disposed above the holder 5 and it is lowered into engagement with the blank to compress the foam material into a selected shape. An air intake opening 6 is formed in the holder 6 at its center and a conduit 7 connects to the holder 5 and communicates with the opening 6.

Air heated to a temperature of approximately 425 degrees F. is forced through the conduit 7 and into the cavity formed between the holder 5 and the forming tool 9. This heated air flows radially outward through the porous foam material being molded and escapes through an exhaust opening 10 which extends around the outer periphery of the holder 5. After a preselected time interval, the forming tool is raised, the ear cushion 1 is removed and another blank is inserted in its place for the next molding cycle.

As shown in FIG. 2, the shape of the forming tool 9 used in the preferred embodiment results in a smooth contoured surface 4 which extends completely around the circumference of the ear cushion 1. This shape is selected primarily for user comfort and acoustical properties, and it should be apparent that other contours such as that disclosed in U.S. Pat. No. 4,170,275 issued on Oct. 9, 1979 may also be molded according to the present invention.

The cycle time of the molding process is determined by the type of material used, the temperature of the heated air and the rate at which air is forced through the material. The rate at which heated air can be forced through the material should not exceed an amount which will destroy cell structure, and in the preferred embodiment, a rate of twenty to thirty cubic feet per minute is used. For the material used in the preferred embodiment, a molding temperature ranging from approximately 380 degrees F. to 450 degrees F. will work. At 380 degrees F. the molding time is almost one minute and at 450 degrees F. the cycle time is from ten to fifteen seconds. At the preferred temperature of 425 degrees F., the molding cycle time is from twenty to twenty-three seconds.

The optimal molding conditions will of course vary with the type of material used. Cycle times can be reduced by increasing air temperature and air flow rate, but the risk of damaging the cellular structure also increases. Such damage may render the acoustic properties of the resulting ear cushion unpredictable and it may also discolor the material. For any selected material, therefore, the optimum air temperature and air flow rate must be determined with these factors in mind.

We claim:

1. A method of forming an ear cushion from porous foam material, the steps comprising:
    cutting an ear cushion blank from a flexible porous thermal formable foam material;
    compressing the ear cushion blank with a forming tool to a selected shape; and
    forcing a gas which is heated to within the thermal forming temperature range through the porous foam material such that the ear cushion retains a desired shape when the forming tool is removed.

2. The method as recited in claim 1 in which the porous foam material is polyurethane foam in which a portion of the cells are open.

3. The method as recited in claim 1 in which the porous foam material is a reticulated polyurethane foam.

4. The method as recited in claim 1 in which the ear cushion blank is placed on a holder and the ear cushion blank is compressed between the holder and the forming tool.

5. The method as recited in claim 4 in which the heated gas forced through the porous foam material is introduced through an intake opening formed in the holder and flows radially outward from the opening through an exhaust opening which extends around the periphery of the ear cushion blank.

6. The method as recited in claim 5 in which a central opening is formed through the ear cushion blank and said intake opening is aligned to introduce the heated gas into the cavity formed by said central opening.

7. The method as recited in claim 2 in which said gas is heated to a temperature between 380 degrees F. and 450 degrees F.

* * * * *